US010245650B2

(12) United States Patent
Haimer et al.

(10) Patent No.: US 10,245,650 B2
(45) Date of Patent: Apr. 2, 2019

(54) CHUCKING DEVICE (71) Applicant: HAIMER GMBH, Igenhausen (DE)

(72) Inventors: Franz Haimer, Igenhausen (DE); Wolfgang Kügle, Aichach-Griesbeckerzell (DE)

(73) Assignee: Haimer GmbH, Igenhausen (DE)

( * ) Notice: Subject to any disclaimer, the term of this patent is extended or adjusted under 35 U.S.C. 154(b) by 68 days.

(21) Appl. No.: 14/914,945

(22) PCT Filed: Sep. 8, 2014

(86) PCT No.: PCT/EP2014/069049
§ 371 (c)(1),
(2) Date: Feb. 26, 2016

(87) PCT Pub. No.: WO2015/036353
PCT Pub. Date: Mar. 19, 2015

(65) Prior Publication Data
US 2016/0221086 A1 Aug. 4, 2016

(30) Foreign Application Priority Data

Sep. 12, 2013 (DE) .......................... 10 2013 110 043

(51) Int. Cl.
*B23B 31/20* (2006.01)
*B23B 31/113* (2006.01)
(Continued)

(52) U.S. Cl.
CPC ............ *B23B 31/202* (2013.01); *B23B 31/20* (2013.01); *B23B 31/005* (2013.01); *B23B 31/107* (2013.01);
(Continued)

(58) Field of Classification Search
CPC ..... B23B 31/20; B23B 31/202; B23B 31/107; B23B 31/113; B23B 2231/20;
(Continued)

(56) References Cited

U.S. PATENT DOCUMENTS 2,391,550 A   12/1945  Cope
3,311,383 A    3/1967  Cox
(Continued)

FOREIGN PATENT DOCUMENTS

CH        269249 A      6/1950
DE       2329064 A1     1/1975
(Continued)

OTHER PUBLICATIONS

English translation of the Written Opinion dated Feb. 1, 2016 for PCT/EP2014/069049 filed Sep. 8, 2014.
(Continued)

*Primary Examiner* — Eric A Gates
*Assistant Examiner* — Chwen-Wei Su
(74) *Attorney, Agent, or Firm* — Paul D. Bianco; Stephen Bongini; Fleit Gibbons Gutman Bongini & Bianco PL (57) ABSTRACT A chucking device for a tool includes a tool receiving element; a collet for clamping the tool, the collet being inserted in an opening in the tool receiving element; a clamping nut for axially displacing the collet in relation to the tool receiving element; and a pressure piece which is arranged between the clamping nut and the collet and is rotatably mounted in relation to the clamping nut, by means of which piece the collet can be axially displaced in relation to the tool receiving element by the clamping nut. To permit a tool shank to be securely clamped in and released from the collet, even under extremely high clamping forces, the
(Continued)

pressure piece has coupling elements for a torsion-proof connection to corresponding mating elements of the tool receiving element.

20 Claims, 4 Drawing Sheets

(51) Int. Cl.
  *B23B 31/107* (2006.01)
  *B23B 31/00* (2006.01)
  *B23B 31/117* (2006.01)
(52) U.S. Cl.
  CPC ......... *B23B 31/113* (2013.01); *B23B 31/1177* (2013.01); *B23B 2231/2005* (2013.01); *B23B 2231/2089* (2013.01); *B23B 2240/04* (2013.01); *B23B 2260/008* (2013.01); *B23B 2260/106* (2013.01)
(58) Field of Classification Search
  CPC ...... B23B 2231/2008; B23B 2231/201; B23B 2231/028; B23B 2231/0264; B23B 2231/2005; B23B 2260/008; Y10T 279/17299; Y10T 279/17504; Y10T 279/17418; Y10T 279/17316; Y10T 279/17761; Y10T 279/17888
  See application file for complete search history.

(56) References Cited

U.S. PATENT DOCUMENTS

| | | | | |
|---|---|---|---|---|
| 3,671,050 A | * | 6/1972 | Andersson | B23B 31/20 279/47 |
| 3,726,532 A | * | 4/1973 | Zeilinger | B23B 31/20 279/52 |
| 3,734,513 A | * | 5/1973 | Kanebako | B23B 31/20 279/48 |
| 3,894,743 A | * | 7/1975 | Hiroumi | B23B 31/20 279/140 |
| 4,437,801 A | * | 3/1984 | Lewis | B23B 31/1074 279/52 |
| 5,277,090 A | * | 1/1994 | Shintani | B23B 5/02 82/112 |
| 5,522,605 A | | 6/1996 | Lewis et al. | |
| 2014/0227057 A1 | | 8/2014 | Haimer | |

FOREIGN PATENT DOCUMENTS

| | | | | |
|---|---|---|---|---|
| DE | 4115992 A1 | * | 11/1992 | ........... B23B 31/202 |
| DE | 102006048447 A1 | | 4/2008 | |
| DE | 202011109498 U1 | * | 2/2012 | ........... B23B 31/005 |
| DE | 102011052747 A1 | | 2/2013 | |
| DE | 10 2011 113494 A1 | | 3/2013 | |
| DE | 102011113494 A1 | | 3/2013 | |
| GB | 646119 A | * | 11/1950 | ............. B23B 31/20 |
| GB | 729051 A | * | 5/1955 | ........... B23B 31/202 |
| GB | 1058953 A | * | 2/1967 | ............. B23B 31/20 |
| JP | 50-027486 U1 | | 1/1975 | |
| JP | 2009131930 A | * | 6/2009 | |
| WO | 9302822 A1 | | 2/1993 | |
| WO | 9605012 A1 | | 2/1996 | |

OTHER PUBLICATIONS

English transation of International Preliminary Report on Patentability dated Mar. 15, 2016 for PCT/EP2014/069049 filed Sep. 8, 2014
International Search Report dated Mar. 10, 2015 for PCT/EP2014/069049.
International Search Report dated Mar. 10, 2015 for PCT/EP2014/069049 filed Sep. 8, 2014.
Written Opinion dated Mar. 20, 2015 for PCT/EP2014/069049 filed Sep. 8, 2014.
Result of search report for German Application No. 10 2013 110 043.0 filed Sep. 12, 2013.
Japanese Examination Report dated Jun. 26, 2018 for Application No. 2016-541904.

* cited by examiner

CHUCKING DEVICE

FIELD OF THE INVENTION

The present invention relates to a chucking device as well as to a collet, a tool receiving element, and a clamping nut for use with said chucking device.

BACKGROUND

DE 10 2011 113 494 A1 discloses a chucking device which is configured in the form of a collet chuck and which comprises a tool receiving element, a collet, a collet for clamping the tool, said collet being inserted in an opening in the tool receiving element, and a clamping nut for axially displacing the collet in relation to the tool receiving element. The collet has a cylindrical bore for clamping a tool shank of a tool and a conical outside surface for contacting a corresponding conical inside surface of the tool receiving element. To enable the collet to move radially and thus to clamp the tool shank which is disposed in the cylindrical bore of the collet to be clamped in, the collet has a plurality of longitudinal slits which are distributed in the circumferential direction. To generate the radial force required for clamping the tool shank onto the collet, the collet is connected via a thread connection to the tool receiving element and displaces the collet with the conical outside surface against the conical inside surface in the tool receiving element when the clamping nut is rotated relative to the tool receiving element. This subjects the collet to radial compression and causes the tool shank to be clamped in the cylindrical bore of the collet. However, clamping the collet by rotating the clamping nut relative to the tool receiving element can lead to increased friction especially when the clamping forces between the clamping nut and the collet are very high, thereby transmitting torque from the clamping nut to the collet, which causes the collet to twist in itself. In consequence, it is often not possible to guarantee that the tool shaft is securely clamped by the collet.

To avoid this drawback, WO 96/05012 A1 proposes that a pressure piece be disposed between the clamping nut and the collet, said pressure piece being rotatably mounted in relation to the clamping nut. This pressure piece allows the collet to be axially displaced in relation to the tool receiving element, thereby considerably reducing the friction between the clamping nut and the pressure piece. However, especially under particular, under extremely high clamping forces, even this type of construction does not reliably prevent a transmission of torque from the clamping nut to the collet. In addition, to permit the collet to be easily released from the tool receiving element, it is customary to connect the collet by means of a snap connection to the clamping nut, thus allowing the collet to be removed from the tool receiving element when the clamping nut is loosened. Especially under high clamping forces, however, it may take considerable force to remove the collet from the tool receiving element since the collet and the tool receiving element may be connected to each other so as to be self- and friction-locked. In many cases, the snap connection is too weak to transmit the pulling force required. In addition, especially at high torques and high clamping forces, a suboptimum distribution of the longitudinal slits in the prior-art collets can lead to an uneven distribution of the clamping force since the collet does not respond in a uniformly flexible manner to the transmission of the clamping force.

SUMMARY OF THE INVENTION

At least some embodiments of the invention permit a tool shank to be securely clamped in and released from the collet even under extremely high clamping forces The invention relates to a chucking device, a collet, a tool receiving element and a clamping nut. Other embodiments of the invention are also disclosed.

The chucking device disclosed by the present invention is characterized in that the pressure piece comprises coupling elements for a torsion-proof connection to corresponding mating elements in the tool receiving element. This reliably prevents the pressure piece from rotating relative to the tool receiving element, thereby also avoiding the transmission of torque to the collet. The coupling elements can be configured, e.g., as projections in the form of pins or the like, and the corresponding mating elements can be configured as receiving parts in the form of bores or the like. It is, of course, also possible to configure the coupling elements for receiving the corresponding mating elements in the form projections.

In a useful embodiment of the invention, the pressure piece and the collet are connected to each other by means of a coupling so as to be torsion-proof and detachable in such a manner that the pressure piece and the collet assume a predefined angular position relative to each other. The coupling can expediently be configured in the form of a bayonet lock. This ensures a simple and quick-to-use connection at a constant angle between the collet and the pressure piece, which connection is also capable of transmitting the pulling forces required to release the connection. In addition, in contrast to the conventional snap connections, it is not necessary to deform the collet when connecting it to the pressure piece.

To ensure torsion-proof positioning of the collet at a defined angle in the tool receiving element, a useful embodiment of the invention proposes that the collet comprise detent lugs for the torsion-proof engagement in corresponding detent grooves in the tool receiving element. This similarly avoids a rotational movement of the collet both during clamping by the clamping nut and during operation by the torques acting on the tool. Again, the detent lugs can be disposed on the tool receiving element and the detent grooves can be disposed on the collet.

On one of its inside surfaces, the collet can expediently comprise locking elements for a torsion-proof, preferably interlocking, connection to the tool. This has the effect that the tool is securely mounted in the collet and that wear caused by a relative movement between the tool and the collet is avoided.

To enable easy mounting of the collet, which is connected to the pressure piece by means of the coupling, on the tool receiving element, it is preferably provided that the detent grooves in the tool receiving element are positioned at the same angle relative to the mating elements in the tool receiving element as the detent lugs on the collet relative to the coupling elements of the pressure piece. This can be accomplished, inter alia, by means of the corresponding reproducible precise coupling between the collet and the pressure piece, for example in the form of a bayonet lock. This ensures that the detent lugs of the collet and the coupling elements of the pressure piece can be reliably and rapidly inserted, respectively, into the corresponding detent grooves or mating elements without additional adjustments.

A useful embodiment of the invention provides that the detent lugs on the collet project by a greater extent from the collet than the coupling elements project from the pressure piece. This ensures that during mounting, first the detent lugs come into contact with the tool receiving element and, by means of a rotational movement, can be made to engage in the detent grooves. As soon as the detent lugs are at least partially engaged in the detent grooves of the tool receiving element, the coupling elements, owing to the correspondingly aligned angular position, are precisely positioned relative to the mating elements in the tool receiving element and can be inserted into each other. Subsequently, the clamping nut can be connected to the tool receiving element by means of a thread connection.

In a preferred embodiment of the invention, the pressure piece is rotatably mounted relative to the clamping nut by means of at least one spherical roller bearing. Preferably, the spherical rollers of this spherical roller bearing are arranged in a cross configuration relative to each other, which allows extremely high forces to be transmitted.

To properly center the clamping nut relative to the tool receiving element, the clamping nut can have cylindrical inside surfaces for centering contact with the corresponding outside surfaces of the tool receiving element. This prevents that an eccentric positioning of the clamping nut relative to the tool receiving element has a negative effect on the collet and thus on the clamping of the tool.

Another aspect of the invention relates to the longitudinal slits in the collet which are disposed on the collet according to the present invention. Extensive tests have demonstrated that the shape of the longitudinal slits and the slit pattern are decisive for an optimum transmission of the clamping force especially at high torques.

Thus, to ensure secure clamping at high torques, one solution proposed by the invention is to configure the collet with at least two sets of longitudinal slits, each comprising at least three longitudinal slits in order to ensure optimum flexibility of the collet and thus an ideal transmission of force. These sets of longitudinal slits comprise a first longitudinal slit which traverses the collet starting at a first end face of the collet and extending at least to half the length of the collet, a second longitudinal slit which traverses the collet starting at an end face disposed opposite to the first end face and extending at least to half the length of the collet, and a third longitudinal slit which traverses at least half the length the collet but starts at a distance from the first end face and from the second end face of the collet. Owing to this type of configuration of the sets of longitudinal slits, a relatively warp-free deformation of the collet during clamping is made possible. Although the collet is radially compressed, the cylindrical bore disposed in the collet for clamping a tool shank retains it cylindrical shape. Especially the lateral surface lines of the bore remain largely parallel to one another and to the axis of rotation. Owing to the optimum surface contact between the bore and the tool shank, this ensures especially secure clamping and high runout accuracy.

In a useful embodiment of the invention, the sets of longitudinal slits are positioned at the same angle relative to each other. In an especially preferred version, the collet comprises 3, 4, 5, 6, 7 or 8 sets of longitudinal slits. Dimensioning depends on the diameter of the tool shank to be clamped. According to the present invention, it is also possible to dispose a plurality of identically configured longitudinal slits in a set of longitudinal slits, The collet according to the present invention having sets of longitudinal slits can also be used in prior-art chucking device and therefore has very versatile applications.

BRIEF DESCRIPTION OF THE DRAWINGS

Additional features and advantages of the present invention follow from the description of a preferred practical example with reference to the drawing. As can be seen.

DETAILED DESCRIPTION OF THE INVENTION

Figure 1:
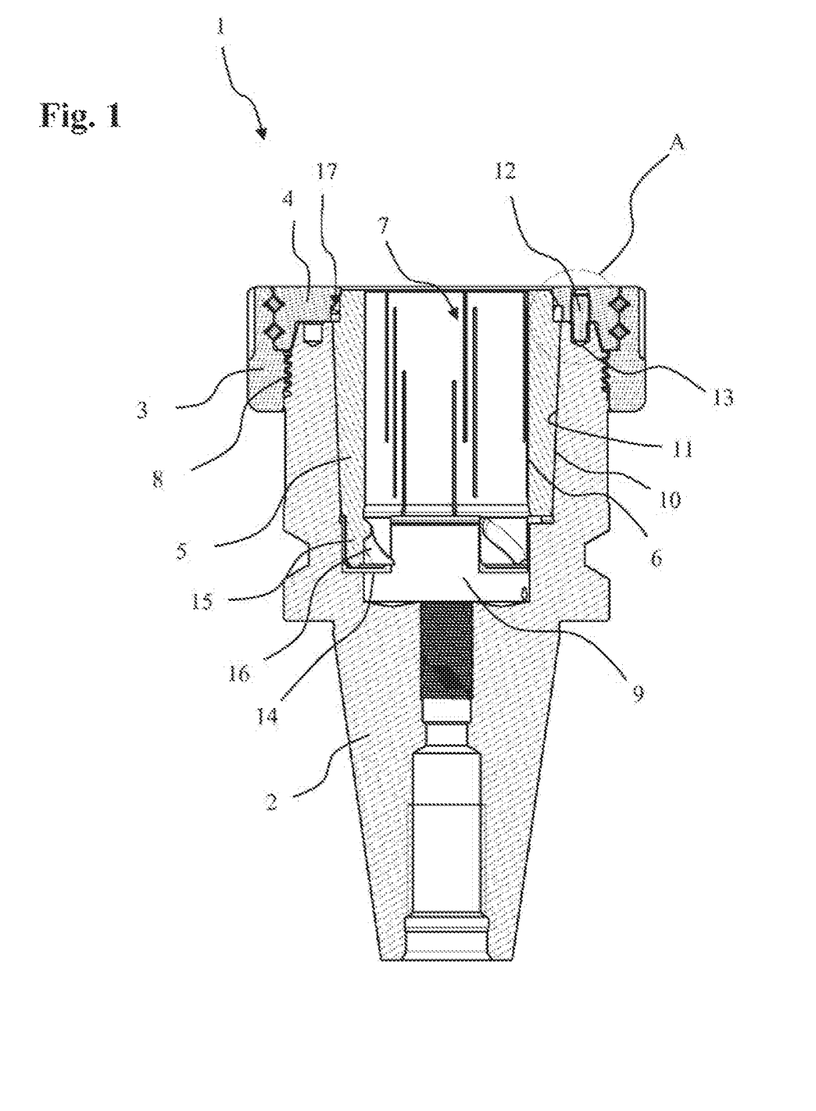
FIG. 1 shows a sectional view through a chucking device according to the present invention.

FIG. 1 shows a sectional view through a chucking device 1 which is configured in the form of a collet chuck. The chucking device 1 comprises a tool receiving element 2, a clamping nut 3, a pressure piece 4 and a collet 5. The collet 5 has a cylindrical bore 6 into which a tool shank of a tool (not shown) can be inserted and held. To clamp the tool shank, the collet 5 can be deformed in the radial direction, which is accomplished by means of a plurality of sets of longitudinal slits 7 which are uniformly distributed in the circumferential direction of the collet 5. The collet 5 can be radially deformed by means of an axial displacement of the collet 5 in relation to the tool receiving element 2. By turning the clamping nut 3, which is connected to the tool receiving element 2 by means of a thread connection 8, the collet 5 can be moved by means of the pressure piece 4, which is disposed between the clamping nut 3 and the collet 5, in the longitudinal direction of the tool receiving element 2 into a central opening 9 in the tool receiving element 2. To be able to generate a radial force on the collet 5 from this longitudinal movement of the collet 5 in relation to the tool receiving element 2, the collet 5 has a conical outside surface 10 which rests against a corresponding conical inside surface 11 in the opening 9 of the tool receiving element 2. Thus, when the collet 5 moves in the direction of the tool receiving element 2, a radially inwardly directed force that acts on the collect 5 is generated, which causes the collet 5 to be compressed and allows a tool which is disposed in the bore 6 of the collet 5 to be reliably clamped.

As a result of the configuration of the pressure piece 4 between the clamping nut 3 and the collet 5, the transmission of torque between the clamping nut 3 and the collect 5 is reduced. In addition, the pressure piece 4 also comprises a plurality of coupling elements 12 which are distributed along the circumference and which engage in corresponding mating elements 13 in the tool receiving element 2, which effectively prevents a rotational movement of the pressure piece 4 relative to the tool receiving element 2.

In addition, as FIG. 1 demonstrates, the opening 9 in the tool receiving element 2 comprises detent grooves 14 which are distributed in the circumferential direction and into which the corresponding detent lugs 15 on the collet 5 engage. This ensures a torsion-proof connection between the collet 5 and the tool receiving element 2. Therefore, torques acting during operation on the tool cannot cause a rotational movement between the collet 5 and the tool receiving element 2. In order to effectively prevent a rotational movement and the associated wear between the tool and the collet 5, stop elements 16 are configured on the cylindrical bore 6 or preferably on the inside surfaces of the detent lugs 15, which stop elements project into the cylindrical bore 6 of the collet 5 and thus ensure an interlocking connection to the tool shank of the tool.

The detent lugs 15 are disposed on the surface of collet 5 which faces the tool receiving element 2. Between the detent lugs 15 and the tool receiving element 2, a gap of a few hundredths of millimeters is provided, so that the detent lugs 15 can radially rest against the tool receiving element 2, which ensures that the tool is securely retained especially when the tool exerts pressure on the stop elements 16.

Figure 2:
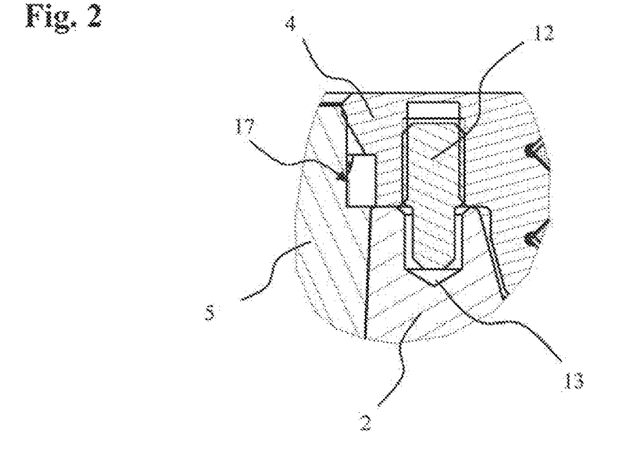
FIG. 2 shows a detail view of detail A of FIG. 1.

FIG. 2 shows a detail view of detail A of FIG. 1. As FIG. 2 indicates, the coupling elements 12 are configured as projections in the form of pins and are rigidly connected to the pressure piece 4 by means of a thread connection or a press-fit connection. The coupling elements 12 engage in the corresponding mating elements 13 which are configured as receiving parts in the form of blind holes. In the mating elements 13, the coupling elements 12 can have some radial clearance in order to make it easier to insert the coupling elements 12 into the mating elements 13.

The collet 5 is connected to the pressure piece 4 by means of a coupling 17 configured in the form of a bayonet lock or a similar torsion-proof and detachable connection at a constant angle. As conventionally observed in bayonet locks, the collet 5 can be made to occupy a torsion-proof end position relative to the pressure piece 4 by joining it to the pressure piece 4 and by subsequently twisting it relative to the pressure piece 4. In this end position of the coupling 17, the position of the pressure piece 4 relative to the collet 5 is clearly predefined and reproducible. The configuration of the coupling elements 12 and the detent lugs 15 and the angle at which they are positioned relative to one another conforms to the configuration and the angle at which the mating elements 13 and the detent grooves 14 are positioned relative to one another so that these are aligned to each other and allow them to be seamlessly joined.

Figure 3:
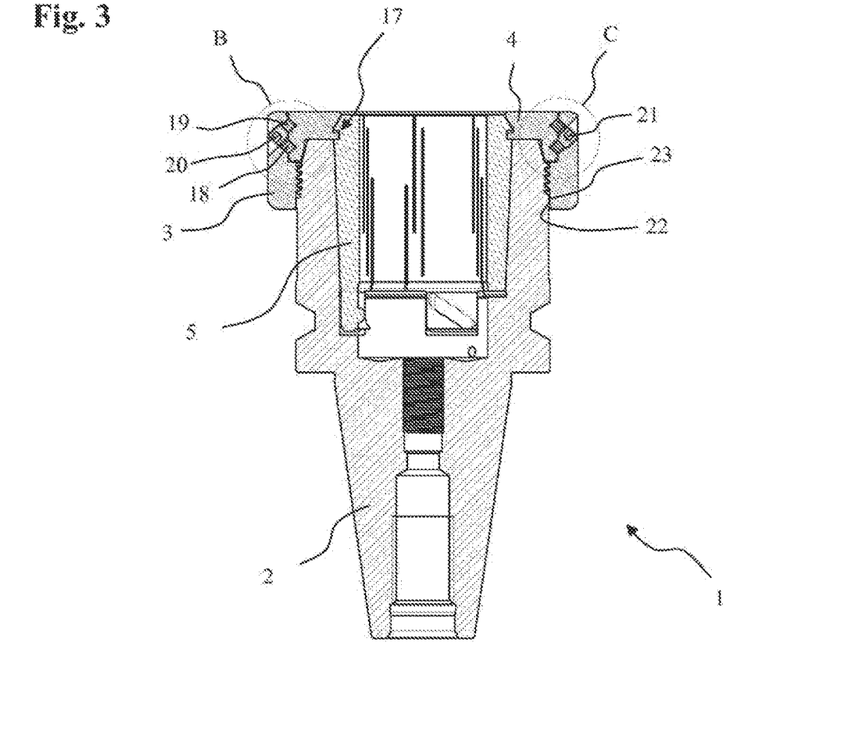
FIG. 3 shows a second sectional view through the chucking device 1 of FIG. 1.

FIG. 3 shows a second sectional view of the chucking device 1 of FIG. 1. As can be seen, the detent lugs 15 on der collet 5 project to a greater extent from the collet 5 than the coupling elements 12 project from the pressure piece 4. This ensures that when mounting the unit comprising the clamping nut 3, the pressure piece 4 and the collet 5 on the tool receiving element 2, first the detent lugs 15 come into contact with the tool receiving element 2 and can be made to engage in the detent grooves 14 by a simple rotational movement relative to each other. As soon as the detent lugs 15 are at least partially engaged in the detent grooves 14 of the tool receiving element 2, the coupling elements 12, owing to the correspondingly aligned angular position, are also precisely positioned relative to the mating elements 13 in the tool receiving element 2 and can subsequently be simply joined together and connected by means of the 8 thread connection. This ensures an especially quick and easy installation of the chucking device 1.

As FIG. 3 also shows, the pressure piece 4 is rotatably mounted relative to the clamping nut 3 by means of a first roller bearing 18 and a second roller bearing 19. The roller bearings 18 and 19 are configured in the form of spherical roller bearings. The spherical rollers in each roller bearing are arranged in a cross configuration so that each roller bearing can independently transmit both pressure forces and pulling forces. In addition, locking screws 20 and 21 are provided, which locking screws make it possible to access the roller elements of the first roller bearing 18 and the second roller bearing 19, said roller elements being configured in the form of spherical rollers.

To center the clamping nut 3 in relation to the tool receiving element 2, the clamping nut 3 upstream of the thread connection 8 has a cylindrical inside surface 22 which is configured for contact with a cylindrical outside surface 23 of the tool receiving element 2. To mutually center the two surfaces, a very small gap between the cylindrical inside surface 22 and the cylindrical outside surface 23 is provided. However, the fit can also be configured in the form of a transition fit or a press fit. When mounting the clamping nut 3, the cylindrical inside surface 22 and the cylindrical outside surface 23 come into contact with each other and thereby ensure a concentric configuration of the clamping nut 3 in relation to the tool receiving element 2. This ensures that in case of an eccentric displacement of the clamping nut relative to the tool receiving element 2, radial forces, which can impair especially the runout accuracy of the clamping [sic] of the tool in the collet 5, do not act upon the collet 5.

Figure 4:
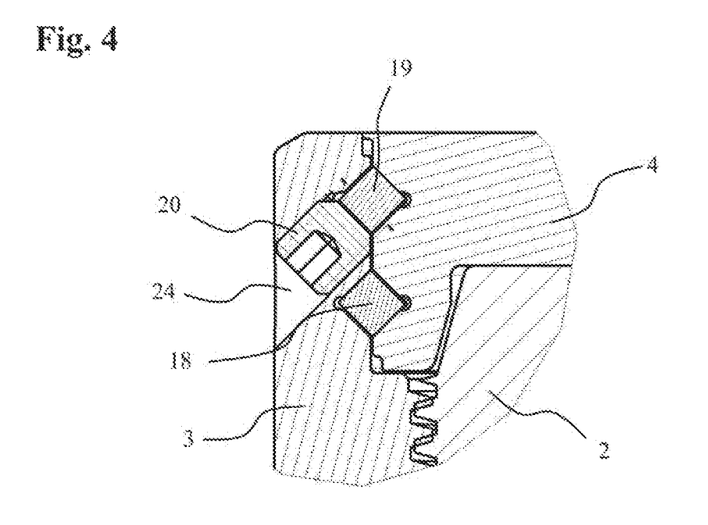
FIG. 4 shows a detail view of detail B of FIG. 3.

The detail view of FIG. 4 illustrates detail B of FIG. 3. As shown in FIG. 4, the roller bearings 18 and 19 in the longitudinal direction of the chucking device 1 are disposed so as to be offset with respect to each other. To ensure that the pressure piece 4 is stably and precisely mounted on the clamping nut 3, the roller elements in the roller bearings 18 and 19 are preferably arranged in a cross configuration with respect to each other so that each of the roller bearings is independently able to transmit both pulling and pressure forces. In a variant, the roller elements in one of the roller bearings can be disposed in the pressure direction and in the other roller bearing in the pulling direction. To insert the roller elements of the second roller bearing 19 between the pressure piece 4 and the clamping nut 3, a threaded bore 24 which opens out into the roller bearing 19 is provided. To avoid that the roller elements accidentally fall out of the second roller bearing 19, the threaded bore 24 is plugged by means of the locking screw 20 which is configured in the form of a set screw.

Figure 5:
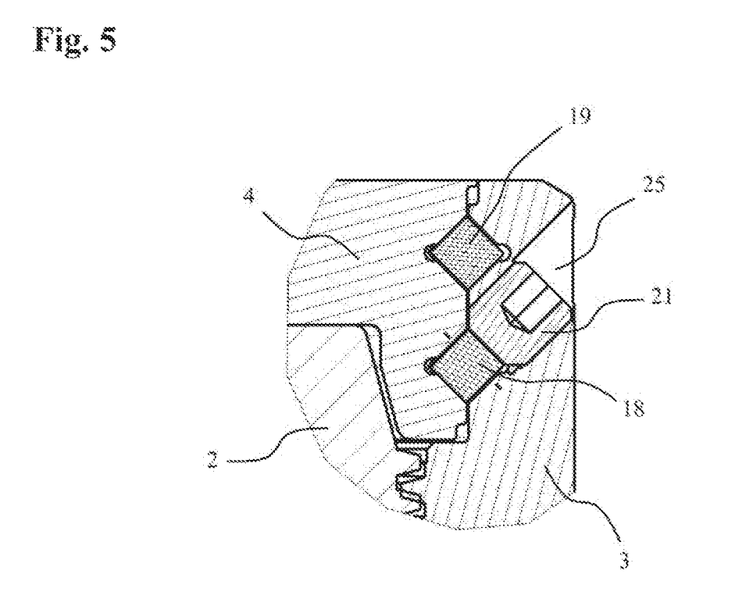
FIG. 5 shows a detail view of detail C of FIG. 3.

In FIG. 5, detail C of FIG. 3 is shown in a detail view. In contrast to the detail shown in FIG. 4, in detail C shown in FIG. 5, a locking screw 21 is used to plug a threaded bore 25, through which the roller elements can be inserted into the first roller bearing 18.

Figure 6:
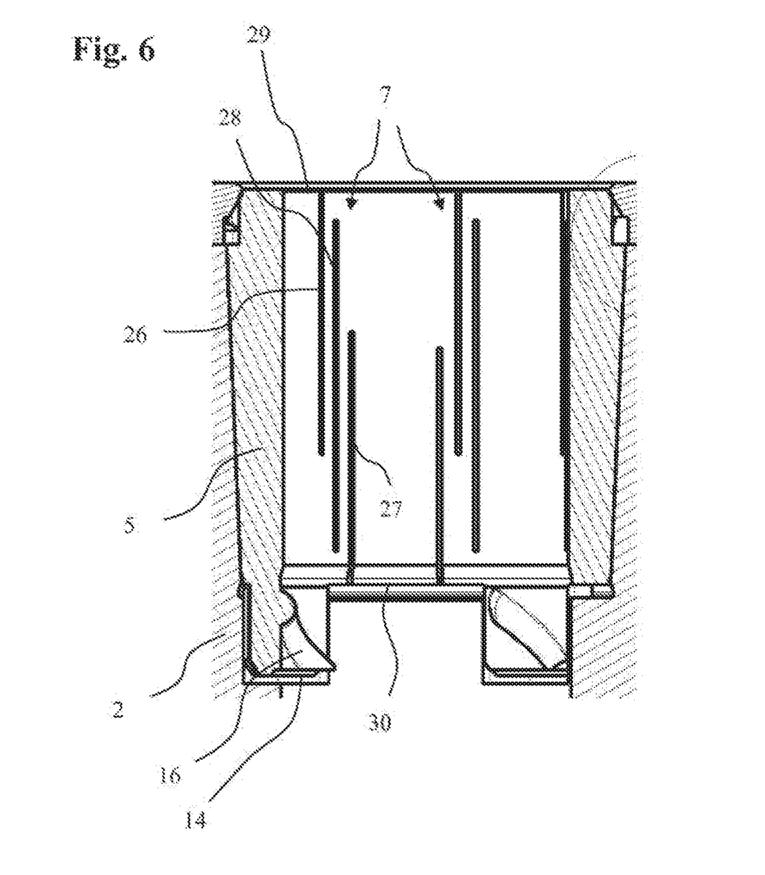
FIG. 6 shows a detail view of the chucking device shown in FIG. 1.

In the detail view of FIG. 6, the collet 5 shown in FIG. 1 is illustrated. The collet 5 has at least two sets of longitudinal slits 7 which are positioned at the same angle with respect to each other. Each set of longitudinal slits 7 comprises at least three longitudinal slits 26, 27 and 28. A first longitudinal slit 26 starts on a first end face 29 of the collect 5 and traverses the collet 5 extending at least to half the length of the collet. A second longitudinal slit 27 traverses the collet 5 starting on a second end face 30 of the collet 5 disposed opposite to the first end face 29 and extending at least to half the length of the collet. A third longitudinal slit 28 finally traverses the collet 5 extending at least to half the length of the collet but starts at a distance from the first end face 29 and from the second end face 30. The longitudinal slits 26, 27 and 28 in the circumferential direction of the collet 5 can be disposed in random sequence.

In addition to the embodiment illustrated in the figures, it is, however, also possible to configure the collet 5 so as to be torsion-proof in relation to the tool receiving element 2 solely by means of the coupling 17 which is configured in the form of a bayonet lock and the coupling elements 12 which engage in the mating elements 13. In this case, the detent grooves 14 in the opening 9 of the tool receiving element 2 can be dispensed with. In order to also mount the tool so as to be torsion-proof in relation to the tool receiving element 2, it can furthermore be provided that the detent lugs 15 radially rest against the tool receiving element 2 and comprise on their inside surface stop elements 16 for an interlocking connection to the tool.

The invention claimed is:

1. A chucking device for a tool, said chucking device comprising:
   a tool receiving element;
   a collet for clamping the tool, said collet being inserted into an opening in the tool receiving element;
   a clamping nut for axially displacing the collet in relation to the tool receiving element; and
   a pressure piece which is disposed between the clamping nut and the collet and is rotatably mounted in relation to the clamping nut, such that the pressure piece allows the collet to be axially displaced in relation to the tool receiving element by the clamping nut,
   wherein the pressure piece comprises coupling elements for a torsion-proof connection to corresponding mating elements of the tool receiving element,
   the pressure piece and the collet are connected by a coupling so as to be torsion-proof and detachable in such a manner that the pressure piece and the collet assume a predefined angular position in relation to each other when connected by the coupling,
   one of the collet and the tool receiving element includes detent lugs for torsion-proof engagement in corresponding detent grooves of the other of the collet and the tool receiving element, the detent lugs engaging in the detent grooves by a rotational movement relative to each other, and
   the detent grooves or detent lugs of the tool receiving element are positioned at the same angle relative to the mating elements of the tool receiving element as the detent lugs or detent grooves of the collet are positioned relative to the coupling elements of the pressure piece.

2. The chucking device of claim 1, wherein the coupling elements on the pressure piece are configured in the form of one of projections and recesses, and the mating elements on the tool receiving element are configured in the form of corresponding the other of recesses and projections.

3. The chucking device of claim 2, wherein the coupling that connects the pressure piece and the collet is configured in the form of a bayonet lock.

4. The chucking device of claim 3,
   wherein the collet includes the detent lugs,
   the detent lugs of the collet on an inside surface have stop elements for a torsion-proof connection to the tool, the stop elements projecting into a bore of the collet to ensure an interlocking connection to the tool,
   the detent lugs project to a greater extent from the collet than the coupling elements project from the pressure piece, and
   the clamping nut has a cylindrical inside surface for centering contact with a corresponding cylindrical outside surface of the tool receiving element.

5. The chucking device of claim 1,
   wherein the collet includes the detent lugs, and
   the detent lugs project to a greater extent from the collet than the coupling elements project from the pressure piece.

6. The chucking device of claim 1, wherein the coupling that connects the pressure piece and the collet is configured in the form of a bayonet lock.

7. The chucking device of claim 1,
   wherein the collet includes the detent lugs, and
   the detent lugs of the collet on an inside surface have stop elements for a torsion-proof connection to the tool, the stop elements projecting into a bore of the collet to ensure an interlocking connection to the tool.

8. The chucking device of claim 1,
   wherein the collet includes the detent lugs and the tool receiving element includes the detent grooves, and
   the detent grooves in the tool receiving element have the same angular position in relation to the mating elements of the tool receiving element as the detent lugs of the collet have in relation to the coupling elements of the pressure piece.

9. The chucking device of claim 5, wherein the coupling that connects the pressure piece and the collet is configured in the form of a bayonet lock.

10. The chucking device of claim 1, wherein the clamping nut has a cylindrical inside surface for centering contact with a corresponding cylindrical outside surface of the tool receiving element.

11. The chucking device of claim 1,
    wherein the collet includes the detent lugs, the detent lugs on an inside surface having stop elements for a torsion-proof connection to the tool, and
    a gap is provided between the detent lugs and the tool receiving element so that the detent lugs can radially rest against the tool receiving element to ensure that the tool is securely retained when the tool exerts pressure on the stop elements.

12. The chucking device of claim 1,
    wherein the collet includes the detent lugs, the detent lugs on an inside surface having stop elements for a torsion-proof connection to the tool, and
    a gap on the order of a few hundredths of millimeters is provided between the detent lugs and the tool receiving element so that the detent lugs can radially rest against the tool receiving element to ensure that the tool is securely retained when the tool exerts pressure on the stop elements.

13. The chucking device of claim 1, wherein each of the detent lugs is an integral part of the one of the collet and the tool receiving element.

14. A chucking device for a tool, said chucking device comprising:
    a tool receiving element;
    a collet for clamping the tool, said collet being inserted into an opening in the tool receiving element;
    a clamping nut for axially displacing the collet in relation to the tool receiving element; and
    a pressure piece which is disposed between the clamping nut and the collet and is rotatably mounted in relation to the clamping nut, such that the pressure piece allows the collet to be axially displaced in relation to the tool receiving element by the clamping nut,
    wherein the pressure piece comprises coupling elements for a torsion-proof connection to corresponding mating elements of the tool receiving element,
    the pressure piece and the collet are connected by a coupling so as to be torsion-proof and detachable in such a manner that the pressure piece and the collet assume a predefined angular position in relation to each other when connected by the coupling,
    one of the collet and the tool receiving element includes detent lugs for torsion-proof engagement in corresponding detent grooves of the other of the collet and the tool receiving element, and
    the pressure piece is mounted relative to the clamping nut by at least one spherical roller bearing, the spherical rollers of which are arranged in a cross configuration relative to each other so that each of the roller bearings is independently able to transmit both pulling and pressure forces.

15. The chucking device of claim 14, wherein the pressure piece is mounted relative to the clamping nut by a first spherical roller bearing and a second spherical roller bearing, the first and second spherical roller bearings being disposed so as to be offset with respect to each other in the longitudinal direction of the chucking device, and the roller elements in the first and second spherical roller bearings being arranged in a cross configuration with respect to each other so that each of the spherical roller bearings is independently able to transmit both pulling and pressure forces.

16. The chucking device of claim 15, wherein a first locking screw is provided to allow access to the roller elements of the first spherical roller bearing, and a second locking screw is provided to allow access to the roller elements of the second spherical roller bearing.

17. The chucking device of claim 15, wherein a first threaded bore opening into the first spherical roller bearing and plugged by a first locking screw allows insertion of the roller elements of the first spherical roller bearing between the pressure piece and the clamping nut, and a second threaded bore opening into the second spherical roller bearing and plugged by a second locking screw allows insertion of the roller elements of the second spherical roller bearing between the pressure piece and the clamping nut.

18. The chucking device of claim 14, wherein at least one locking screw is provided to allow access to the roller elements of the at least one roller bearing.

19. The chucking device of claim 14, wherein at least one threaded bore opening into the at least one roller bearing and plugged by at least one locking screw allows insertion of the roller elements of the at least one roller bearing between the pressure piece and the clamping nut.

20. The chucking device of claim 14, wherein the detent lugs engage in the detent grooves by a rotational movement relative to each other.

* * * * *